United States Patent
Ushiroda et al.

(10) Patent No.: US 7,793,750 B2
(45) Date of Patent: Sep. 14, 2010

(54) DIFFERENTIAL LIMITING CONTROL APPARATUS FOR FOUR-WHEEL DRIVE VEHICLE

(75) Inventors: Yuichi Ushiroda, Okazaki (JP); Kaoru Sawase, Anjo (JP); Yusuke Fujii, Nagoya (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 97 days.

(21) Appl. No.: 11/922,340

(22) PCT Filed: Jun. 27, 2006

(86) PCT No.: PCT/JP2006/312803
§ 371 (c)(1),
(2), (4) Date: Dec. 17, 2007

(87) PCT Pub. No.: WO2007/010715
PCT Pub. Date: Jan. 25, 2007

(65) Prior Publication Data
US 2009/0127014 A1 May 21, 2009

(30) Foreign Application Priority Data
Jul. 19, 2005 (JP) .............................. 2005-208401

(51) Int. Cl.
*B60K 17/35* (2006.01)
(52) U.S. Cl. .................... 180/249; 180/76; 180/248; 180/245; 180/233
(58) Field of Classification Search ............... 180/249, 180/248, 247, 245, 233
See application file for complete search history.

(56) References Cited

U.S. PATENT DOCUMENTS

| | | | | |
|---|---|---|---|---|
| 5,036,940 A * | 8/1991 | Takemura | ..................... | 180/249 |
| 5,685,386 A * | 11/1997 | Kondo et al. | ................... | 180/76 |
| 5,701,247 A | 12/1997 | Sasaki | | |
| 5,897,601 A * | 4/1999 | Suzuki | .......................... | 701/78 |
| 6,219,609 B1 * | 4/2001 | Matsuno et al. | ................ | 701/72 |
| 6,851,502 B2 * | 2/2005 | Sakazaki | ...................... | 180/248 |
| 2004/0026148 A1 * | 2/2004 | Matsuno | ...................... | 180/248 |
| 2004/0129467 A1 | 7/2004 | Tsuruta et al. | | |
| 2006/0162981 A1 * | 7/2006 | Kurosawa et al. | ............ | 180/249 |
| 2008/0314675 A1 * | 12/2008 | Nozaki et al. | ................ | 180/305 |

FOREIGN PATENT DOCUMENTS

| | | |
|---|---|---|
| JP | 8-2292 A | 1/1996 |
| JP | 2000-85393 A | 3/2000 |
| JP | 2003-237398 A | 8/2003 |

* cited by examiner

*Primary Examiner*—Lesley D Morris
*Assistant Examiner*—Tashiana Adams
(74) *Attorney, Agent, or Firm*—Birch, Stewart, Kolasch & Birch, LLP (57) ABSTRACT

Restraining torque $T_F$ of an electronic controlled front limited slip differential (5) arranged between right and left front wheels is controlled in accordance with controlling right-left wheel rotational speed difference $\Delta N_F$, which is the rotational speed difference between the right and left front wheels, while restraining torque $T_C$ of an electronic controlled coupling (8) arranged between the front and rear wheels is controlled in accordance with controlling front-rear wheel rotational speed difference $\Delta N_C$ obtained by subtracting ½ of the rotational speed difference between the right and left wheels ($|\Delta N_F|/2$) from the rotational speed difference ($\Delta N_{CT}-\Delta N_{CD}$) between the front and rear wheels.

5 Claims, 3 Drawing Sheets

DIFFERENTIAL LIMITING CONTROL APPARATUS FOR FOUR-WHEEL DRIVE VEHICLE

BACKGROUND OF THE INVENTION

1. Field of the Invention

The present invention relates to a differential limiting control apparatus for controlling differential limiting force applied between right and left wheels and between front and rear wheels of a four-wheel drive vehicle.

2. Description of the Related Art

As four-wheel drive vehicles, there have been known an on-demand four-wheel drive vehicle in which motive power from the engine is transmitted at all times to either the front wheels or the rear wheels and, when necessary, part of the motive power is transmitted also to the other of the front wheels and the rear wheels, and a full-time four-wheel drive vehicle in which the driving force is transmitted to the four wheels at all times. In some four-wheel drive vehicles, an electronic controlled differential limiting device is provided between the right and left wheels or between the front and rear wheels. The differential limiting device applies a suitable differential limiting force between the right and left wheels or between the front and rear wheels in accordance with the running condition of the vehicle and the rotational speed difference between the wheels, to make the motive power appropriately distributed among the wheels and thereby improve the turning performance and running stability of the vehicle.

In cases where the inner front wheel of an on-demand four-wheel drive vehicle, for example, slips due to excessive motive power transmitted thereto during turning, differential limiting control is carried out to restrain the inner wheel from slipping by producing a differential limiting force in accordance with the rotational speed difference between the right and left wheels.

Also, a technique for vehicles with no differential limiting device provided between the right and left wheels is known, wherein the differential limiting device arranged between the front and rear wheels is utilized to restrain slipping, as disclosed in Unexamined Japanese Patent Publication No. 2003-237398 (hereinafter referred to as Patent Document 1), for example. Where slipping of one of the four wheels is restrained by means of the differential limiting force applied between the front and rear wheels, the differential limiting force tends to be deficient because the rotational speed difference between the front and rear wheels is ½ that between the right and left wheels caused by the slipping. Taking this into account, in the technique disclosed in Patent Document 1, the differential limiting force is corrected to increase.

However, in situations where the inner front wheel is slipping, the average wheel speed of the right and left front wheels is higher than that of the right and left rear wheels because of the slipping of the inner wheel, and therefore, not only the differential limiting between the right and left wheels but also the differential limiting based on the rotational speed difference between the front and rear wheels are executed. During turning of a vehicle, a rotational speed difference occurs between the front and rear wheels due to an inner wheel turning track difference. Consequently, the differential limiting between the front and rear wheels hinders turning of the vehicle and furthers under-steering, giving rise to the problem that the turning performance of the vehicle lowers.

In the technique disclosed in Patent Document 1, the differential limiting force applied between the front and rear wheels is increased to restrain slipping. Increasing the differential limiting force, however, furthers under-steering and lowers turning performance, with the result that the problem remains unsolved.

SUMMARY OF THE INVENTION

The present invention was made to solve the above problem, and an object thereof is to provide a differential limiting control apparatus for a four-wheel drive vehicle which is capable of restraining under-steering attributable to differential limiting between front and rear wheels when the rotational speed difference between right and left wheels increases due to slipping, thereby maintaining satisfactory turning performance of the vehicle.

To achieve the object, the present invention provides a differential limiting control apparatus for a four-wheel drive vehicle in which, while motive power from an engine is transmitted at all times to at least one pair of front wheels and rear wheels, the motive power is distributed among the front and rear wheels. The differential limiting control apparatus comprises: a right-left wheel differential limiting mechanism arranged between right and left driving wheels to which the motive power is transmitted at all times, for applying a differential limiting force between the right and left driving wheels; a front-rear wheel differential limiting mechanism arranged between the front and rear wheels, for applying a differential limiting force between the front and rear wheels; and front-rear wheel differential limiting control means for correcting a rotational speed difference between the front and rear wheels so as to decrease in accordance with a rotational speed difference between the right and left driving wheels, and controlling the differential limiting force applied by the front-rear wheel differential limiting mechanism, in accordance with the corrected rotational speed difference.

Thus, the rotational speed difference between the front and rear wheels is corrected so as to decrease in accordance with the rotational speed difference between the right and left front wheels or rear wheels to which the motive power of the engine is transmitted at all times, and on the basis of the corrected rotational speed difference, the differential limiting force of the front-rear wheel differential limiting mechanism is controlled by the front-rear wheel differential limiting control means. In a vehicle in which the motive power of the engine is transmitted at all times to the front wheels, for example, if the inner front wheel starts to slip as a result of turning, the average wheel speed of the right and left front wheels becomes higher than that of the right and left rear wheels. With the differential limiting control apparatus of the present invention, the rotational speed difference between the front and rear wheels is corrected so as to decrease in accordance with the rotational speed difference between the right and left front wheels. It is therefore possible to avoid a situation where the differential limiting between the front and rear wheels is intensified due to the rotational speed difference between the right and left front wheels, thus restraining under-steering from being furthered by the differential limiting between the front and rear wheels.

In this manner, the differential limiting control apparatus of the present invention prevents the differential limiting between the front and rear wheels from being intensified when the rotational speed difference between the right and left wheels to which the motive power of the engine is transmitted at all times increases due to slipping, whereby under-steering attributable to the differential limiting between the front and rear wheels is restrained, making it possible to maintain satisfactory turning performance of the vehicle.

Preferably, the differential limiting control apparatus further comprises: target turning rotational speed difference calculation means for calculating a target turning rotational speed difference to be caused between the right and left driving wheels due to turning of the vehicle; and actual rotational speed difference calculation means for calculating an actual rotational speed difference caused between the right and left driving wheels, wherein the front-rear wheel differential limiting control means reckons, as the rotational speed difference between the right and left driving wheels, a difference between the target turning rotational speed difference calculated by the target turning rotational speed difference calculation means and the actual rotational speed difference calculated by the actual rotational speed difference calculation means, and corrects the rotational speed difference between the front and rear wheels so as to decrease in accordance with the reckoned rotational speed difference between the right and left driving wheels.

Thus, the rotational speed difference between the front and rear wheels is corrected so as to decrease in accordance with the difference between the target turning rotational speed difference and the actual rotational speed difference, which is caused due to turning of the vehicle. The rotational speed difference between the right and left wheels contains not only a component attributable to slipping but a component attributable to turning. However, by deriving the difference between the target turning rotational difference and the actual rotational speed difference, it is possible to exclude the component attributable to turning. Consequently, the rotational speed difference caused between the right and left front wheels due to slipping is obtained, and the rotational speed difference between the front and rear wheels is corrected so as to decrease in accordance with the rotational speed difference caused between the right and left front wheels due to slipping.

In this manner, the rotational speed difference between the front and rear wheels is corrected so as to decrease in accordance with the difference between the target turning rotational difference and the actual rotational speed difference, whereby the differential limiting between the front and rear wheels can be executed more appropriately without being influenced by turning of the vehicle.

Preferably, in the differential limiting control apparatus, the front-rear wheel differential limiting control means subtracts ½ of the rotational speed difference between the right and left driving wheels from the rotational speed difference between the front and rear wheels, and controls the differential limiting force of the front-rear wheel differential limiting mechanism in accordance with a rotational speed difference obtained by the subtraction.

Where a rotational speed difference occurs between the right and left wheels due to slipping, the rotational speed difference between the front and rear wheels increases by ½ of the rotational speed difference occurring between the right and left wheels. Taking the phenomenon into account, in the differential limiting control apparatus of the present invention, ½ of the rotational speed difference between the right and left wheels is subtracted from the rotational speed difference between the front and rear wheels, and this makes it possible to substantially perfectly eliminate the influence of the rotational speed difference caused between the right and left wheels due to slipping. Consequently, under-steering attributable to the differential limiting between the front and rear wheels can be restrained without fail.

Preferably, the differential limiting control apparatus further comprises right-left wheel differential limiting control means for controlling the differential limiting force applied by the right-left wheel differential limiting mechanism, in accordance with the rotational speed difference between the right and left driving wheels.

Thus, since the differential limiting force of the right-left wheel differential limiting mechanism is controlled in accordance with the rotational speed difference between the right and left wheels, the differential limiting between the right and left wheels can be optimized at all times. As a result, not only the differential limiting between the front and rear wheels but also the differential limiting between the right and left wheels can be properly executed, making it possible to further improve the turning performance of the vehicle.

DETAILED DESCRIPTION OF THE INVENTION

The present invention will be hereinafter described in detail, wherein the invention is embodied as a differential limiting control apparatus for an electronic control type on-demand four-wheel drive vehicle with an FF layout (front-engine and front drive layout).

Figure 1:
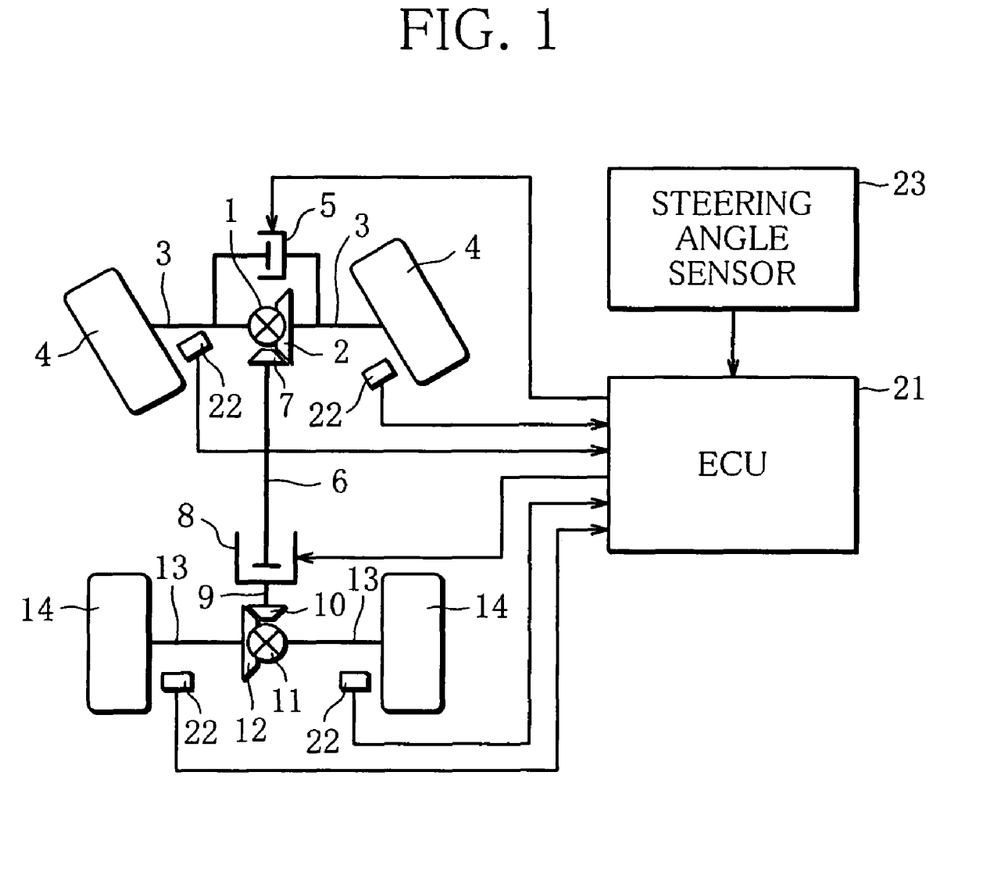
FIG. 1 shows an entire arrangement of a differential limiting control apparatus for an on-demand four-wheel drive vehicle according to an embodiment of the present invention.

FIG. 1 shows an entire arrangement of the differential limiting control apparatus for a four-wheel drive vehicle according to the embodiment. A front differential 1 is arranged between right and left front wheels 4 of the vehicle. A ring gear 2 is fixed to the front differential 1 and is input with motive power from an engine through a transmission, neither is shown. The front differential 1 is coupled through drive shafts 3 to the right and left front wheels 4, respectively, and transmits the motive power of the engine, input to the ring gear 2, to the right and left front wheels 4 while allowing differential action. An electronic controlled front limited slip differential 5 (right-left wheel differential limiting mechanism) is associated with the front differential 1. The front limited slip differential 5 produces a torque restraining relative rotation of the right and left drive shafts 3, in accordance with the state of engagement of a built-in electromagnetic clutch, not shown, to apply a differential limiting force between the right and left front wheels 4.

The ring gear 2 of the front differential 1 is in mesh with a pinion gear 7 which is secured to the front end of a front propeller shaft 6. The front propeller shaft 6 extends toward the rear of the vehicle and has its rear end connected to the front end of a rear propeller shaft 9 through an electronic controlled coupling 8 (front-rear wheel differential limiting mechanism). A pinion gear 10 is secured to the rear end of the rear propeller shaft 9 and meshed with a ring gear 12 of a rear differential 11. The rear differential 11 is coupled through drive shafts 13 to right and left rear wheels 14.

In accordance with the state of engagement of a built-in electromagnetic clutch, not shown, the electronic controlled coupling 8 adjusts the motive power distributed from the front propeller shaft 6 to the rear wheels 14 through the rear propeller shaft 9, and also produces a torque restraining relative rotation of the propeller shafts 6 and 9, to apply a differential limiting force between the front and rear wheels 4 and 14. The motive power distributed to the rear wheels 14 through the electronic controlled coupling 8 is input to the rear differential 11, which then transmits the motive power to the right and left rear wheels 14 while allowing differential action.

A 4WD control ECU 21 is arranged inside the passenger compartment of the vehicle and comprises input/output devices, memories (ROM, RAM, etc.) storing control programs, control maps, etc., a central processing unit (CPU), and timer-counters, none of which are shown. The input side of the 4WD control ECU 21 is connected with various sensors, such as wheel speed sensors 22 for detecting the rotational speeds (wheel speeds $N_{FR}$, $N_{FL}$, $N_{RR}$, $N_{RL}$) of the respective wheels 4 and 14 of the vehicle and a steering angle sensor 23 for detecting steering angle $S_{tr}$. The output side of the 4WD control ECU 21 is connected to various devices such as the electromagnetic clutch of the front limited slip differential 5 and the electromagnetic clutch of the electronic controlled coupling 8.

Based on information detected by the various sensors, the 4WD control ECU 21 controls the front limited slip differential 5 as well as the engagement of the electromagnetic clutch of the electronic controlled coupling 8. For the control of the front limited slip differential 5, the 4WD control ECU 21 adopts a common control technique wherein the clutch engagement is controlled in accordance with a restraining torque which has been set based on the rotational speed difference between the right and left front wheels 4. With respect to the electronic controlled coupling 8, the 4WD control ECU 21 controls the clutch engagement in accordance with a restraining torque that has been set so as to reflect not only the rotational speed difference between the front and rear wheels 4 and 14 but the rotational speed difference between the right and left front wheels 4. These control actions will be explained below.

Figure 2:
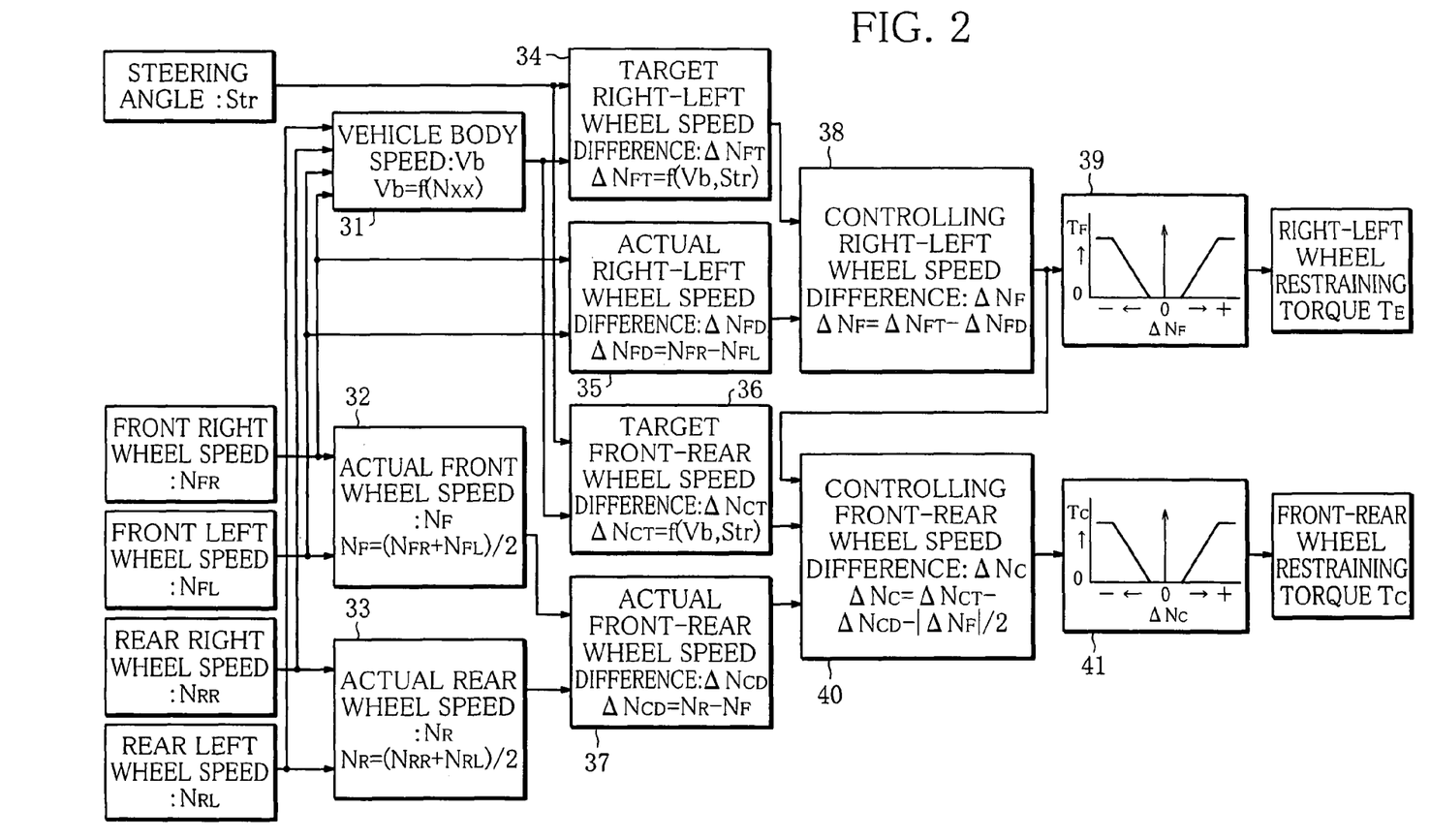
FIG. 2 is a control block diagram illustrating a procedure for setting restraining torques by an ECU.

FIG. 2 is a control block diagram illustrating a procedure for setting the restraining torques for the front limited slip differential 5 and the electronic controlled coupling 8 by the ECU 21.

First, based on the front right wheel speed $N_{FR}$, front left wheel speed $N_{FL}$, rear right wheel speed $N_{RR}$ and rear left wheel speed $N_{RL}$ detected by the respective wheel speed sensors 22, a vehicle body speed calculation block 31 calculates a vehicle body speed $V_b$ as a function of the wheel speeds $N_{FR}$, $N_{FL}$, $N_{RR}$ and $N_{RL}$, according to Equation (1) below. In Equation (1), $N_{xx}$ represents the wheel speeds $N_{FR}$, $N_{FL}$, $N_{RR}$ and $N_{RL}$.

$$V_b = f(N_{xx}) \quad (1)$$

Also, based on the right and left front wheel speeds $N_{FR}$ and $N_{FL}$, an actual front wheel speed calculation block 32 calculates an actual front wheel speed $N_F$ according to Equation (2) below. Similarly, based on the right and left rear wheel speeds $N_{RR}$ and $N_{RL}$, an actual rear wheel speed calculation block 33 calculates an actual rear wheel speed $N_R$ according to Equation (3) also indicated below.

$$N_F = (N_{FR} + N_{FL})/2 \quad (2)$$

$$N_R = (N_{RR} + N_{RL})/2 \quad (3)$$

Based on the vehicle body speed $V_b$ and the steering angle $S_{tr}$ detected by the steering angle sensor 23, a target right-left wheel rotational speed difference calculation block 34 (target turning rotational speed difference calculation means) calculates a target right-left wheel rotational speed difference $\Delta N_{FT}$ for the front wheels 4, as a function of the vehicle body speed $V_b$ and the steering angle $S_{tr}$, according to Equation (4) below. The target right-left wheel rotational speed difference $\Delta N_{FT}$ is calculated as a rotational speed difference between the right and left front wheels 4 with which the current turning of the vehicle is carried out without the occurrence of slipping. Also, based on the right and left front wheel speeds $N_{FR}$ and $N_{FL}$, an actual right-left wheel rotational speed difference calculation block 35 (actual rotational speed difference calculation means) calculates an actual right-left wheel rotational speed difference $\Delta N_{FD}$ between the front wheels 4, according to Equation (5) below.

$$\Delta N_{FT} = f(V_b, S_{tr}) \quad (4)$$

$$\Delta N_{FD} = N_{FR} - N_{FL} \quad (5)$$

Further, based on the vehicle body speed $V_b$ and the steering angle $S_{tr}$, a target front-rear wheel rotational speed difference calculation block 36 calculates a target front-rear wheel rotational speed difference $\Delta N_{CT}$ as a function of the vehicle body speed $V_b$ and the steering angle $S_{tr}$, according to Equation (6) below. The target front-rear wheel rotational speed difference $\Delta N_{CT}$ is calculated as a rotational speed difference between the front and rear wheels 4 and 14 with which the current turning of the vehicle is carried out without the occurrence of slipping. Also, based on the actual front and rear wheel speeds $N_F$ and $N_R$, an actual front-rear wheel rotational speed difference calculation block 37 calculates an actual front-rear wheel rotational speed difference $\Delta N_{CD}$ according to Equation (7) below.

$$\Delta N_{CT} = f(V_b, S_{tr}) \quad (6)$$

$$\Delta N_{CD} = N_R - N_F \quad (7)$$

Then, based on the target right-left wheel rotational speed difference $\Delta N_{FT}$ and the actual right-left wheel rotational speed difference $\Delta N_{FD}$, a controlling right-left wheel rotational speed difference calculation block 38 calculates a controlling right-left wheel rotational speed difference $\Delta N_F$ according to Equation (8) below. A right-left wheel restraining torque calculation block 39 calculates, based on the controlling right-left wheel rotational speed difference $\Delta N_F$, a right-left wheel restraining torque $T_F$ by means of a preset map.

Thus, the controlling right-left wheel rotational speed difference calculation block 38 and the right-left wheel restraining torque calculation block 39 correspond to the right-left wheel differential limiting control means of the present invention. Basically, the right-left wheel restraining torque $T_F$ is set so that the controlling right-left wheel rotational speed difference $\Delta N_F$ may converge to "0". As seen from the figure, as the controlling right-left wheel rotational speed difference $\Delta N_F$ increases or decreases beyond a dead zone including "0", the right-left wheel restraining torque $T_F$ is increased in proportion to $\Delta N_F$, and if $\Delta N_F$ becomes greater than or smaller than a certain value, the restraining torque $T_F$ is restricted to a predetermined upper limit value. The map characteristic is not limited to the illustrated one and may be modified as desired in accordance with the specification of the vehicle and the required running characteristics.

$$\Delta N_F = \Delta N_{FT} - \Delta N_{FD} \quad (8)$$

The restraining torque actually applied by the front limited slip differential 5 is controlled on the basis of the right-left wheel restraining torque $T_F$ set in this manner. Specifically, a duty factor corresponding to the right-left wheel restraining torque $T_F$ is selected from a map, not shown, and the energizing power of the electromagnetic clutch is controlled in accordance with the duty factor, to adjust the engagement of the clutch. As a result, the restraining torque applied by the front limited slip differential 5 is controlled to the right-left wheel restraining torque $T_F$, so that differential limiting is applied between the right and left front wheels 4.

On the other hand, a controlling front-rear wheel rotational speed difference calculation block 40 calculates, based on the target front-rear wheel rotational speed difference $\Delta N_{CT}$, the actual front-rear wheel rotational speed difference $\Delta N_{CD}$ and the controlling right-left wheel rotational speed difference $\Delta N_F$, a controlling front-rear wheel rotational speed difference $\Delta N_C$ according to Equation (9) below. Then, based on the controlling front-rear wheel rotational speed difference $\Delta N_C$, a front-rear wheel restraining torque calculation block 41 calculates a front-rear wheel restraining torque $T_C$ by means of a preset map. Accordingly, the controlling front-rear wheel rotational speed difference calculation block 40 and the front-rear wheel restraining torque calculation block 41 correspond to the front-rear wheel differential limiting control means of the present invention. As in the case of the right-left wheel restraining torque $T_F$, the front-rear wheel restraining torque $T_C$ is set so that the controlling front-rear wheel rotational speed difference $\Delta N_C$ may converge to "0". In the illustrated example, the front-rear wheel restraining torque $T_C$ is set using a map with the same characteristic as that of the map for setting the right-left wheel restraining torque $T_F$, but these maps may of course have different characteristics.

$$\Delta N_C = \Delta N_{CT} - \Delta N_{CD} - |\Delta N_F|/2 \quad (9)$$

Then, a duty factor corresponding to the obtained front-rear wheel restraining torque $T_C$ is selected from a map, not shown, and the energizing power of the electromagnetic clutch is controlled in accordance with the duty factor, to adjust the engagement of the clutch. As a result, the restraining torque applied by the electronic controlled coupling 8 is controlled to the front-rear wheel restraining torque $T_C$, so that differential limiting is applied between the front and rear wheels 4 and 14.

The following explains how slipping is suppressed by the aforementioned restraining torque control executed by the ECU 21.

From the above Equations (5) and (8), the following Equation (10) is derived as a basic equation for calculating the controlling right-left wheel rotational speed difference $\Delta N_F$.

$$\Delta N_F = \Delta N_{FT} - (N_{FR} - N_{FL}) \quad (10)$$

While no slip is occurring ($\Delta N_F = 0$), the target right-left wheel rotational speed difference $\Delta N_{FT}$ is given by the following Equation (11):

$$\Delta N_{FT} = (N_{FR} - N_{FL}) \quad (11)$$

Also, from Equations (7) and (9), Equation (12) below is derived as a basic equation for calculating the controlling front-rear wheel rotational speed difference $\Delta N_C$.

$$\Delta N_C = \Delta N_{CT} - \{N_R - (N_{FR} + N_{FL})/2\} - |\Delta N_F|/2 \quad (12)$$

Further, while no slip is occurring ($\Delta N_C = 0$), the target front-rear wheel rotational speed difference $\Delta N_{CT}$ is given by the following Equation (13):

$$\Delta N_{CT} = (N_R - N_F) \quad (13)$$

During turning of the vehicle, on the other hand, the manner of slipping, or the phase of slip, of the front wheels 4 varies depending on the motive power from the engine. As the motive power increases, first, the inner front wheel 4 begins to slip (first phase), then the outer front wheel also begins to slip (second phase), and as the motive power further increases, the rotational speed of the outer wheel catches up with that of the inner wheel so that the amounts of slipping, or slippages, of the inner and outer front wheels 4 become substantially equal to each other (third phase). Appropriate differential limiting to be applied between the right and left front wheels 4 and between the front and rear wheels 4 and 14 differs depending on which of these three phases current slipping falls into. In the following, the restraining torque control executed by the ECU 21 will be verified with respect to each phase of slip.

As the first phase in which the inner front wheel 4 starts to slip as a result of increased motive power during turning of the vehicle, let us consider a situation where the front left wheel speed $N_{FL}$ has increased by a slippage N' (i.e., $N_{FL} \rightarrow N_{FL} + $ N'). Modifying the above Equations (10) to (13) so as to reflect the situation provides the following Equations (14) and (15):

$$\Delta N_F = \Delta N_{FT} - (N_{FR} - N_{FL} - N') = N' \quad (14)$$

$$\Delta N_C = \Delta N_{CT} - \{N_R - (N_{FR} + N_{FL} + N')/2\} - |\Delta N_F|/2 = 0 \quad (15)$$

Thus, at this time, the slippage N' corresponding to the actual right-left wheel rotational speed difference $\Delta N_{FD}$ is calculated as the controlling right-left wheel rotational speed difference $\Delta N_F$, as indicated by Equation (14). In order to suppress the controlling right-left wheel rotational speed difference $\Delta N_F$, the restraining torque applied by the front limited slip differential 5 is controlled on the basis of the right-left wheel restraining torque $T_F$, and corresponding differential limiting is applied between the right and left front wheels 4.

On the other hand, because of the increase of the front left wheel speed $N_{FL}$ by the slippage N', the actual front wheel speed $N_F$ and hence the actual front-rear wheel rotational speed difference $\Delta N_{CD}$ increase by ½ of the slippage N' (i.e., N'/2). However, since ½ of the controlling right-left wheel rotational speed difference $\Delta N_F$ (i.e., $|\Delta N_F|/2 = N'/2$) is subtracted, "0" is calculated as the controlling front-rear wheel rotational speed difference $\Delta N_C$, as indicated by Equation (15). As a consequence, the front-rear wheel restraining torque $T_C$ is also set to "0", so that no differential limiting is applied between the front and rear wheels 4 and 14 by the electronic controlled coupling 8.

In this manner, in cases where the inner front wheel 4 slips, the motive power transmitted to the outer front wheel is increased while the slipping of the inner front wheel is restrained by the differential limiting applied between the right and left front wheels 4. At the same time the differential limiting between the front and rear wheels 4 and 14 is suspended, and thereby a situation where the differential limiting between the front and rear wheels 4 and 14 is intensified due to the rotational speed difference between the right and left front wheels 4 is avoided. Accordingly, under-steering is suppressed, thereby maintaining satisfactory turning performance.

In the above Equation (15), $|\Delta N_F|/2$, which corresponds to the increment of the rotational speed difference between the front and rear wheels 4 and 14 attributable to the rotational speed difference between the right and left front wheels 4, is subtracted to totally eliminate the influence exerted by the rotational speed difference between the right and left front wheels 4. However, the subtracter should not necessarily be set to $|\Delta N_F|/2$ and may be varied as desired in accordance with the demanded running characteristics of the vehicle. In this case, the differential limiting between the front and rear wheels 4 and 14 intensifies regardless of whether the subtracter is increased or decreased from $|\Delta N_F|/2$, as seen from Equation (15) and the map characteristic of the front-rear wheel restraining torque calculation block 41.

As the second phase in which the outer front wheel 4, besides the inner front wheel 4, begins to slip as a result of increased motive power during turning of the vehicle, let us consider a situation where the front left wheel speed $N_{FL}$ has increased by the slippage N' (i.e., $N_{FL} \rightarrow N_{FL}+N'$) and the front right wheel speed $N_{FR}$ has increased by a slippage N'/2 (i.e., $N_{FR} \rightarrow N_{FR}+N'/2$). Modifying the above Equations (10) to (13) so as to reflect this situation provides the following Equations (16) and (17):

$$\Delta N_F = \Delta N_{FT} - (N_{FR}+N'/2-N_{FL}-N') = N'/2 \quad (16)$$

$$\Delta N_C = \Delta N_{CT} - \{N_R - (N_{FR}+N'/2+N_{FL}+N')/2\} - |\Delta N_F|/2 = N'/2 \quad (17)$$

Thus, at this time, the slippage N'/2 corresponding to the actual right-left wheel rotational speed difference $\Delta N_{FD}$ is calculated as the controlling right-left wheel rotational speed difference $\Delta N_F$, as indicated by Equation (16). In order to suppress the controlling right-left wheel rotational speed difference $\Delta N_F$, the restraining torque applied by the front limited slip differential 5 is controlled on the basis of the right-left wheel restraining torque $T_F$, and corresponding differential limiting is applied between the right and left front wheels 4 to restrain the slipping of the right and left front wheels 4.

On the other hand, since the front left wheel speed $N_{FL}$ has increased by the slippage N' and also the front right wheel speed $N_{FR}$ has increased by the slippage N'/2, the actual front wheel speed $N_F$ and hence the actual front-rear wheel rotational speed difference $\Delta N_{CD}$ increase by ¾ of the slippage N' (i.e., (N'/2+N')/2). However, since ½ of the controlling right-left wheel rotational speed difference $\Delta N_F$ (i.e., $|\Delta N_F|/2 = N'/4$) is subtracted, N'/2 is calculated as the controlling front-rear wheel rotational speed difference $\Delta N_C$, as indicated by Equation (17). As a consequence, the restraining torque of the electronic controlled coupling 8 is controlled in accordance with the front-rear wheel restraining torque $T_C$, so as to suppress the controlling front-rear wheel rotational speed difference $\Delta N_C$, and corresponding differential limiting is applied between the front and rear wheels 4 and 14.

In this manner, in cases where the outer front wheel 4, in addition to the inner front wheel, begins to slip, the slipping of the inner front wheel, of which the slippage is largest, is restrained by the differential limiting between the right and left front wheels 4, while at the same time the power distribution ratio for the rear wheels 14 is increased by the differential limiting between the front and rear wheels 4 and 14 so that the driving force may be secured for the four wheels as a whole. Because of these factors, satisfactory turning performance is maintained.

As the third phase in which the slippages of the inner and outer front wheels 4 become equal to each other as a result of increased motive power during turning of the vehicle, let us consider a situation where both the front left wheel speed $N_{FL}$ and the front right wheel speed $N_{FR}$ have increased by the slippage N' (i.e., $N_{FL} \rightarrow N_{FL}+N'$; $N_{FR} \rightarrow N_{FR}+N'$). Modifying the above Equations (10) to (13) so as to reflect this situation provides the following Equations (18) and (19):

$$\Delta N_F = \Delta N_{FT} - (N_{FR}+N'-N_{FL}-N') = 0 \quad (18)$$

$$\Delta N_C = \Delta N_{CT} - \{N_R - (N_{FR}+N'+N_{FL}+N')/2\} - |\Delta N_F|/2 = N' \quad (19)$$

Namely, at this time, "0" is calculated as the controlling right-left wheel rotational speed difference $\Delta N_F$, as indicated by Equation (18). Accordingly, no differential limiting is applied between the right and left front wheels 4 by the front limited slip differential 5.

On the other hand, because of the increase of the left and right front wheel speeds $N_{FL}$ and $N_{FR}$ by the slippage N', the actual front wheel speed $N_F$ and hence the actual front-rear wheel rotational speed difference $\Delta N_{CD}$ increase by the slippage N'. Meanwhile, since the controlling right-left wheel rotational speed difference $\Delta N_F$ is "0", N' is calculated as the controlling front-rear wheel rotational speed difference $\Delta N_C$, as indicated by Equation (19). Consequently, the restraining torque applied by the electronic controlled coupling 8 is controlled in accordance with the front-rear wheel restraining torque $T_C$, so as to suppress the controlling front-rear wheel rotational speed difference $\Delta N_C$, so that corresponding differential limiting is applied between the front and rear wheels 4 and 14.

In this manner, in cases where the slippages of the inner and outer front wheels 4 become substantially equal to each other, the differential limiting between the right and left front wheels 4 is suspended because such differential limiting is unnecessary, while at the same time the power distribution ratio for the rear wheels 14 is increased further by the differential limiting between the front and rear wheels 4 and 14 so that the driving force may be secured for the four wheels as a whole, thereby maintaining satisfactory turning performance.

The aforementioned three phases of slip are caused not only by the increase of the motive power from the engine but also by the difference in friction coefficient of the road surface. As the friction coefficient decreases, the state of slipping changes from the first phase toward the third phase. With the differential limiting control apparatus of the embodiment, differential limiting that is always appropriate to the state of the slipping of the right and left front wheels 4 is applied between the front and rear wheels 4 and 14, whereby the most desirable turning performance is achieved.

Specifically, when the inner front wheel 4 begins to slip, the differential limiting between the front and rear wheels 4 and 14 is suspended to restrain under-steering, thereby maintaining satisfactory turning performance. This means that the problem with the conventional technique mentioned in the "Description of the Related Art" section can be solved, and the control performed in this case can be regarded as a technique capable of eliminating the influence of the slipping of the right and left front wheels 4 (rotational speed difference between the right and left wheels) on the differential limiting between the front and rear wheels 4 and 14. Besides, the differential limiting control apparatus of this embodiment provides other advantages. Specifically, as the degree of slipping of the right and left front wheels 4 increases (e.g., from the second slip phase to the third slip phase) with increase in the motive power or with decrease in the friction coefficient of the road surface, the rotational speed difference between the right and left wheels is gradually reflected in the differential limiting between the front and rear wheels 4 and 14 to progressively intensify the differential limiting between the front and rear wheels 4 and 14 so that more motive power may be distributed to the rear wheels 14, thereby securing the driving force instead of restraining the slipping. As a result, optimum differential limiting between the front and rear wheels 4 and 14 and hence the most desirable turning performance can be ensured at all times irrespective of the state of slipping of the right and left front wheels 4.

In addition, in the differential limiting control apparatus of the embodiment, the controlling right-left wheel rotational speed difference $\Delta N_F$ is calculated by deriving the difference between the target right-left wheel rotational speed difference $\Delta N_{FT}$, which is the rotational speed difference between the right and left front wheels 4 assumed to be caused during turning of the vehicle without the occurrence of slipping, and the actual right-left wheel rotational speed difference $\Delta N_{FD}$, which is an actual rotational speed difference between the right and left front wheels. Then, according to Equation (9), ½ of the controlling right-left wheel rotational speed difference $\Delta N_F$ (i.e., $|\Delta N_F|/2$) is subtracted from the rotational speed difference between the front and rear wheels, to obtain the controlling front-rear wheel rotational speed difference $\Delta N_C$. Namely, the actual right-left wheel rotational speed difference $\Delta N_{FD}$ caused during turning of the vehicle involves not only the component attributable to the slipping of the right and left front wheels 4 but the component attributable to the turning of the vehicle. By obtaining the difference between the target right-left wheel rotational speed difference $\Delta N_{FT}$ indicative of the component attributable to the vehicle turning and the actual right-left wheel rotational speed difference $\Delta N_{FD}$, however, it is possible to exclude the component attributable to the vehicle turning, so that the controlling front-rear wheel rotational speed difference $\Delta N_C$ is obtained based on the rotational speed difference between the right and left front wheels 4 attributable to the slipping that actually influences the rotational speed difference between the front and rear wheels 4 and 14. It is therefore possible to calculate the controlling front-rear wheel rotational speed difference $\Delta N_C$ with accuracy at all times without the influence of turning of the vehicle and thus to apply more appropriate differential limiting between the front and rear wheels 4 and 14.

Also, when a rotational speed difference occurs between the right and left front wheels 4 as a result of slipping, the rotational speed difference between the front and rear wheels increases by ½ of the rotational speed difference occurring between the right and left front wheels. Taking the phenomenon into account, according to the embodiment, ½ of the controlling right-left wheel rotational speed difference $\Delta N_F$ (i.e., $|\Delta N_F|/2$) is subtracted from the rotational speed difference between the front and rear wheels, as seen from Equation (9) above. Consequently, when the inner front wheel 4 slips, for example, the influence exerted by the rotational speed difference between the right and left front wheels 4 is almost perfectly eliminated and the differential limiting between the front and rear wheels 4 and 14 is suspended, making it possible to reliably restrain under-steering.

Further, in the embodiment, the differential limiting between the right and left front wheels 4 also is electrically controlled by the front limited slip differential 5 so that differential limiting, which is optimum at all times, may be applied between the right and left front wheels 4 on the basis of the controlling right-left wheel rotational speed difference $\Delta N_F$ obtained from the target right-left wheel rotational speed difference $\Delta N_{FT}$ and the actual right-left wheel rotational speed difference $\Delta N_{FD}$. Also, the controlling right-left wheel rotational speed difference $\Delta N_F$ is used in common to control the differential limiting between the right and left wheels and the differential limiting between the front and rear wheels 4 and 14. As a result, the differential limiting between the right and left wheels and that between the front and rear wheels 4 and 14 are carried out in a manner associated with each other, making it possible to further improve the turning performance of the vehicle.

While the embodiment of the present invention has been described, it is to be noted that the invention is not limited to the foregoing embodiment. For example, in the above description, the invention is embodied as the differential limiting control apparatus for an electronic control type on-demand four-wheel drive vehicle in which the front wheels 4 are driven at all times while the rear wheels 14 are supplied with motive power when necessary. The present invention is also applicable to other types of vehicle, for example, a full-time four-wheel drive vehicle shown in FIG. 3.

Figure 3:
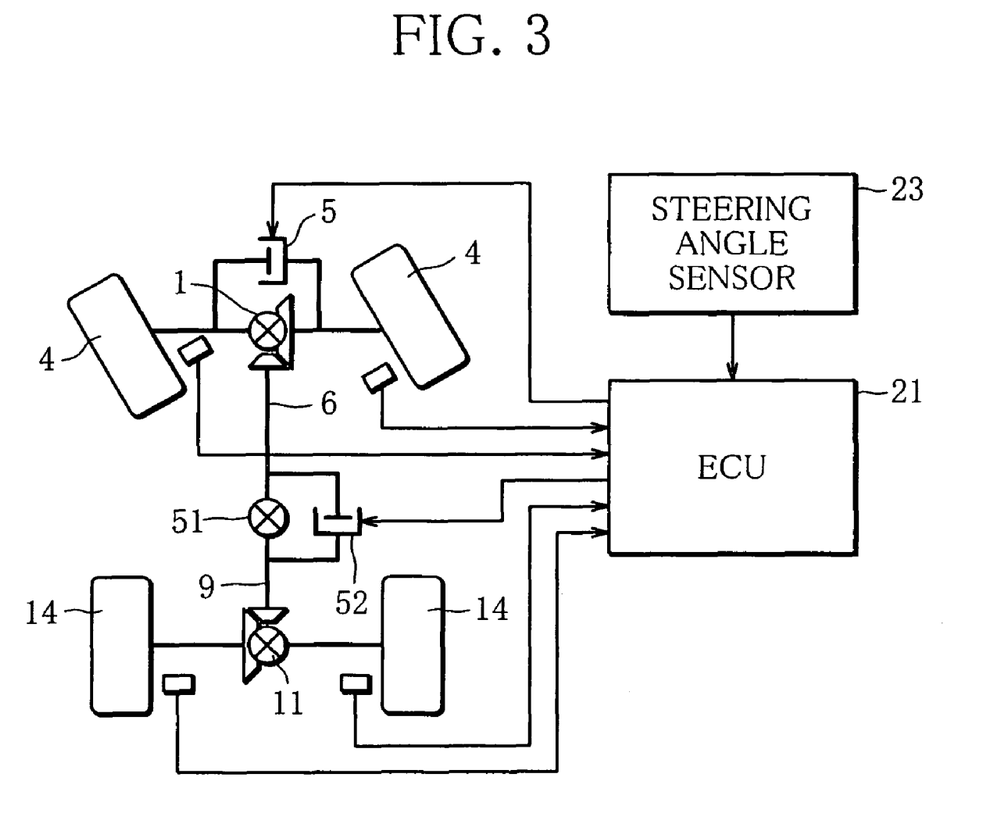
FIG. 3 shows an exemplary arrangement wherein the differential limiting control apparatus of the present invention is applied to a full-time four-wheel drive vehicle.

The following briefly explains how the invention is applied. The front differential 1 and the front limited slip differential 5 associated with the front wheels 4 are constructed in the same manner as those of the foregoing embodiment. A center differential 51 is interposed between the front and rear propeller shafts 6 and 9 and transmits the motive power of the engine at all times to the rear wheels 14 while permitting relative rotation of the two propeller shafts 6 and 9. The center differential 51 is associated with an electronic controlled center limited slip differential 52, which is controlled so as to apply a differential limiting force between the front and rear wheels 4 and 14 in accordance with the rotational speed difference between the front and rear wheels 4 and 14. In the full-time four-wheel drive vehicle constructed as above, when a rotational speed difference occurs between the right and left front wheels 4 due to slipping, the rotational speed difference between the front and rear wheels 4 and 14 which is corrected so as to decrease in accordance with the rotational speed difference between the right and left front wheels may be applied for controlling the differential limiting applied by the center limited slip differential 52, whereby a situation where the differential limiting between the front and rear wheels 4 and 14 is intensified due to the rotational speed difference between the right and left front wheels 4 can be avoided, like the foregoing embodiment, making it possible to restrain under-steering. In cases where the rear wheels 14 also are provided with a differential limiting mechanism similar to the front limited slip differential 5, the rotational speed difference between the front and rear wheels 4 and 14 which is corrected so as to decrease in accordance with the rotational speed difference between the right and left rear wheels 14 may be applied for controlling the differential limiting applied by the center limited slip differential 52.

Also, in the foregoing embodiment, an electromagnetic clutch is used to control the differential limiting between the right and left front wheels 4 and between the front and rear wheels 4 and 14. The device to be used, however, is not limited to the electromagnetic clutch alone and any device may be used insofar as it permits the differential limiting force to be adjusted through electrical control, such as a hydraulic clutch, motor, or pump.

Further, as the differential limiting device for the right and left front wheels 4, a mechanical limited slip differential that mechanically produces a differential limiting force in accordance with the input torque (motive power from the engine) may be used instead of the electronic controlled front limited slip differential.

The invention claimed is:

1. A differential limiting control apparatus for a four-wheel drive vehicle in which, while motive power from an engine is transmitted at all times to at least one pair of front wheels and rear wheels, the motive power is distributed among the front and rear wheels, the differential limiting control apparatus comprising:

a right-left wheel differential limiting mechanism arranged between right and left driving wheels to which the motive power is transmitted at all times, for applying a differential limiting force between the right and left driving wheels;

a front-rear wheel differential limiting mechanism arranged between the front and rear wheels, for applying a differential limiting force between the front and rear wheels; and front-rear wheel differential limiting control unit for correcting an actual speed difference between the front and rear wheels so as to decrease in accordance with a rotational speed difference between the right and left driving wheels, and controlling the differential limiting force applied by the front-rear wheel differential limiting mechanism in accordance with a control amount obtained by using the corrected rotational speed difference between the front and rear wheels.

2. The differential limiting control apparatus according to claim 1, further comprising:

target turning rotational speed difference calculation means for calculating a target turning rotational speed difference to be caused between the right and left driving wheels due to turning of the vehicle; and actual rotational speed difference calculation means for calculating an actual rotational speed difference caused between the right and left driving wheels, wherein the front-rear wheel differential limiting control unit reckons, as the rotational speed difference between the right and left driving wheels, a difference between the target turning rotational speed difference calculated by the target turning rotational speed difference calculation means and the actual rotational speed difference calculated by the actual rotational speed difference calculation means, and corrects the actual rotational speed difference between the front and rear wheels so as to decrease in accordance with the reckoned rotational speed difference between the right and left driving wheels.

3. The differential limiting control apparatus according to claim 1, wherein the front-rear wheel differential limiting control unit subtracts ½ of the rotational speed difference between the right and left driving wheels from the actual rotational speed difference between the front and rear wheels, and controls the differential limiting force of the front-rear wheel differential limiting mechanism in accordance with a rotational speed difference obtained by the subtraction.

4. The differential limiting control apparatus according to claim 1, further comprising:

right-left wheel differential limiting control means for controlling the differential limiting force applied by the right-left wheel differential limiting mechanism, in accordance with the rotational speed difference between the right and left driving wheels.

5. A differential limiting control apparatus for a four-wheel drive vehicle in which, while motive power from an engine is transmitted at all times to at least one pair of front wheels and rear wheels, the motive power is distributed among the front and rear wheels, the differential limiting control apparatus comprising:

a right-left wheel differential limiting mechanism arranged between right and left driving wheels to which the motive power is transmitted at all times, for applying a differential limiting force between the right and left driving wheels;

a front-rear wheel differential limiting mechanism arranged between the front and rear wheels, for applying a differential limiting force between the front and rear wheels; and front-rear wheel differential limiting control unit for correcting a rotational speed difference between the front and rear wheels so as to decrease in accordance with a rotational speed difference between the right and left driving wheels and in accordance with a rotational speed difference between the front and rear wheels, and controlling the differential limiting force applied by the front-rear wheel differential limiting mechanism in accordance with the corrected rotational speed difference.

* * * * *